Oct. 30, 1951          G. MAY          2,573,040

FRONT END ASSEMBLY FOR TRACTORS

Filed March 16, 1951          2 SHEETS—SHEET 1

INVENTOR.
GARNETT MAY
BY
McMorrow, Berman & Davidson
ATTORNEYS

Oct. 30, 1951  G. MAY  2,573,040
FRONT END ASSEMBLY FOR TRACTORS
Filed March 16, 1951  2 SHEETS—SHEET 2
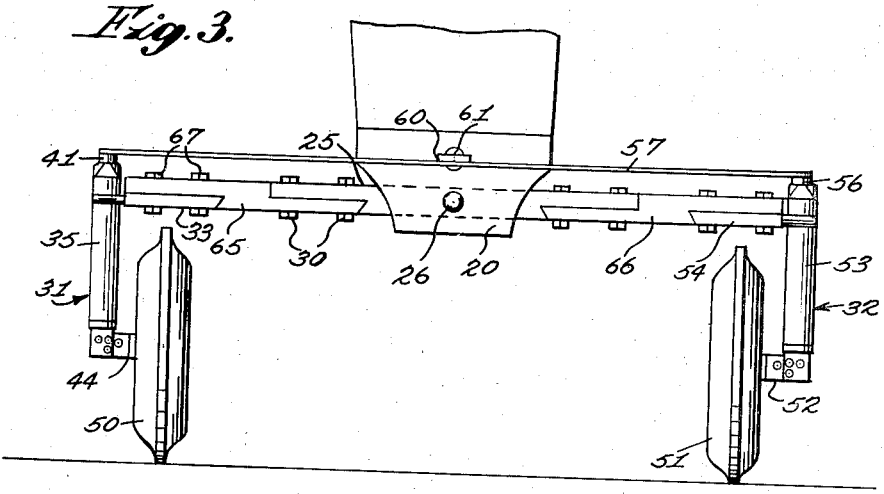
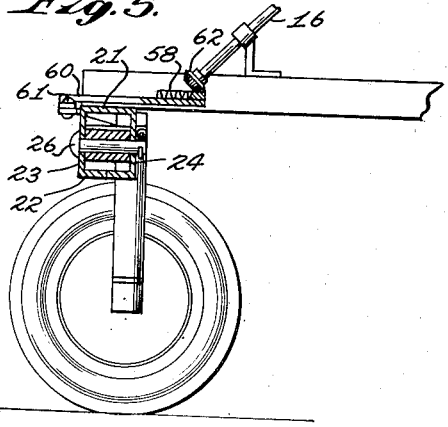
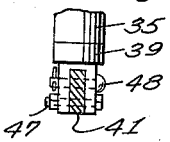
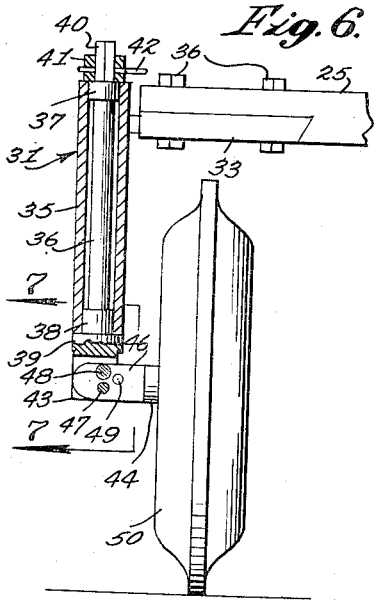
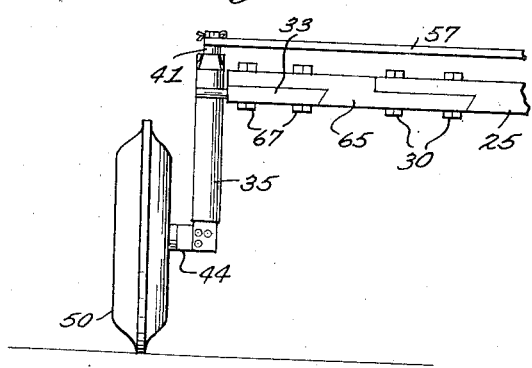
INVENTOR.
GARNETT MAY
BY
McMorrow, Berman & Davidson
ATTORNEYS Patented Oct. 30, 1951

2,573,040

UNITED STATES PATENT OFFICE 2,573,040

FRONT END ASSEMBLY FOR TRACTORS

Garnett May, Lexington, Ky.

Application March 16, 1951, Serial No. 215,908

3 Claims. (Cl. 280—87)

This invention relates to front end assemblies for tractors and more particularly to a front end assembly arranged for varying the spacing between the front wheels of the tractor and the position of the front wheels relative to the tractor frame to condition the tractor for different kinds of work.

It is among the objects of the invention to provide an improved front end assembly for a farm tractor which can be easily mounted on an existing tractor with no material modification of the tractor construction and provides an adjustable mounting for the tractor front wheels so that the same tractor can be used for various kinds of work such as row crop cultivation, plowing, harvesting and highway hauling; which provides for rocking of the tractor about its longitudinal center line relative to the front axle and front wheels; which provides means for mounting the front wheels in either a substantially vertical position or in an inclined or cambered position; which provides a large range of variation in the spacing of the front wheels relative to each other and to the longitudinal center line of the tractor; which provides for steering of the front wheels in all positions of adjustment thereof; which is so easy to adjust that most of the adjustments can be made by one man without the use of a jack for lifting the front end of the tractor; and which is simple, strong and durable in construction, economical to manufacture and easy to install.

Other objects and advantages will become apparent from a consideration of the following description and the appended claims in conjunction with the accompanying drawings, wherein:

Figure 3 is an elevational view of the front end assembly showing the assembly in a different position of adjustment than that illustrated in Figure 1;

Figure 4 is an elevational view of a fragmentary portion of the front end assembly showing a further adjustment of the assembly;

Figure 5 is a cross sectional view on the line 5—5 of Figure 2;

Figure 6 is a cross sectional view on an enlarged scale on the line 6—6 of Figure 2;

Figure 7 is a fragmentary cross sectional view on the line 7—7 of Figure 6; and

Figure 1:
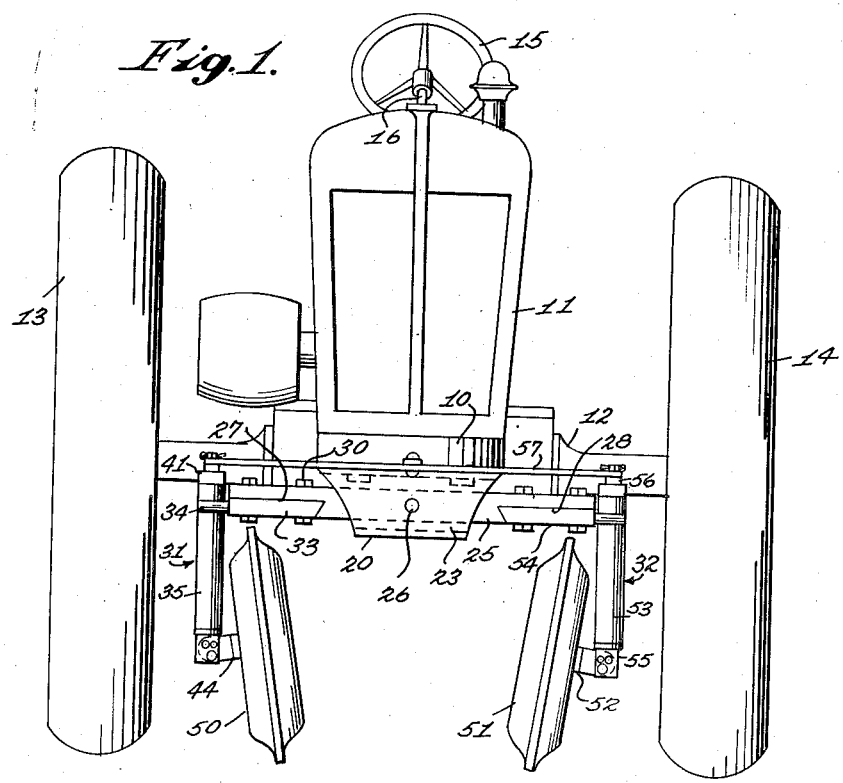
Figure 1 is a front end elevational view of a tractor equipped with a front end assembly illustrative of the invention.

With continued reference to the drawings, the tractor illustrated in Figure 1 may be a known form of farm tractor of any one of several different makes and includes an elongated frame 10, an engine 11 supported on the frame near the front end of the latter, a rear axle 12 at the rear end of the frame, rear drive wheels 13 and 14 disposed one at each end of the rear axle 12, the usual chain speed transmission and differential mechanism supported by the frame between the engine and the rear axle and a steering wheel 15 supported in a location convenient to the operator of the tractor and mounted on one end of a steering shaft 16 which extends from the steering wheel to a location adjacent the front end of the tractor frame for steering the front wheels of the tractor.

The front end assembly of the present invention includes a hollow bracket 20 of rectangular cross sectional shape and having a top wall 21, a bottom wall 22, a front wall 23 and a rear wall 24. The top wall is somewhat longer than the bottom wall and its ends extend outwardly symmetrically of the bottom wall at the opposite ends of the latter. The ends of the front and rear walls are divergently curved from the bottom to the top wall and the front and rear walls are provided each with a centrally located aperture which apertures are in registry with each other transversely of the bracket.

This bracket 20 is secured to the front end of the tractor frame 10 by suitable means, such as bolts, rivets or welding, so that it extends transversely of the tractor frame substantially perpendicular to the longitudinal center line of the tractor with its top and bottom walls in planes substantially parallel to the plane of the tractor frame including the longitudinal center line of the latter.

The top wall of the bracket 20 has a length substantially equal to the width of the tractor frame and the internal cross sectional dimensions of the bracket are such that the bracket will receive a front axle of adequate strength for supporting the front end of the tractor and provide clearance at the upper and lower sides of the axle for rocking movements of the axle relative to the bracket. The bracket may be formed of suitable plate material such as iron boiler plate of sufficient thickness to provide the necessary strength and rigidity of the bracket.

A front axle 25 of rectangular cross sectional shape extends through the bracket 20 and is provided at its mid-length location with a transversely extending aperture registering with the apertures in the front and rear walls of the bracket. A pivot pin 26 extends through the transversely disposed apertures in the bracket 20 and the front axle 25 to pivotally connect the front axle to the bracket. The front axle has a width substantially equal to the distance between the inner sides of the front and rear walls of the bracket but has a thickness materially less than the distance between the inner sides of the top and bottom walls of the bracket, as is clearly illustrated in Figure 5, so that the axle has a limited freedom of rocking movement relative to the bracket and about an axis substantially parallel to the longitudinal center line of the tractor.

Recesses 27 and 28 are provided one in each end of the axle at the under side thereof and extend longitudinally of the axle from the respectively opposite ends thereof. The bottom surface of the axle within each recess is spaced from and parallel to the top surface of the axle and the axle surfaces at the inner ends of the recesses extend transversely of the axle and are inclined upwardly and toward the center of the axle from the bottom surface toward the top surface of the axle. The portions of the axle extending over the recesses 27 and 28 are provided with apertures, as indicated at 29 in Figure 8, spaced apart longitudinally of the axle for the reception of the bolts 30 which secure the front wheel assemblies to the axle at the respectively opposite ends of the axle.

Front wheels assemblies, as generally indicated at 31 and 32, are secured one to each end of the axle 25 and, as these assemblies are substantially identical in construction and arrangement except that one is right hand while the other is left hand, a detail description of one only of these assemblies is considered sufficient for the purposes of the present invention and the assembly 31 has been selected for such detail description.

The front wheel assembly 31 comprises a mounting block 33 of rectangular shape having a width substantially equal to the width of the front axle 25 and a length substantially equal to the length of the recesses 27 and 28. One end of this block is beveled to fit the inclined surface at the inner end of the corresponding recess in the front axle and the block is provided with apertures spaced apart longitudinally of the block and registering with the apertures in the recessed end portion of the front axle to receive the bolts 30 which secure the block to the front axle. A lug 34 projects outwardly from the end of the mounting block 33 at the corresponding end of the axle in longitudinal alignment with the mounting block and a cylindrical sleeve 35 is rigidly secured near one end to the lug 34 and depends from the mounting block 33 substantially perpendicular to the front axle 25. A knuckle pin 36 extends longitudinally through the sleeve 35 and is journaled in the sleeve by suitable antifriction bearings 37 and 38 surrounding the pin and disposed within the sleeve at the upper and lower ends respectively of the latter. A collar formation 39 is provided on the knuckle pin at the lower end of the sleeve 35 and provides an annular shoulder bearing against the lower or bottom end of the sleeve. The pin 36 is provided with a squared portion 40 at its upper end and a steering arm 41 is mounted on this squared portion of the pin. The steering arm has at one end an eye formation provided with an aperture receiving the squared portion of the knuckle pin and bearing upon the upper end of the sleeve 35 so that the collar formation 39 and the eye formation of the steering arm restrain the pin against movement longitudinally of the sleeve. A fastener, such as the cotter key 42, extends through registering apertures disposed transversely of the eye formation of the steering arm and the squared portion 40 of the pin to secure the steering arm on the pin.

Below the collar formation 39 the pin 36 is provided with a flattened end portion 43 provided with spaced apart apertures and a front wheel spindle 44 is provided at one end with a flattened portion 46, one side of which is disposed against one side of the flattened portion 43 of the knuckle pin. The flattened portion 46 of the front wheel spindle is provided with apertures and a pivot bolt 47 extends through one pair of registering apertures in the flattened portion of the knuckle pin and the front wheel spindle to pivotally connect the spindle to the knuckle pin. A locking pin 48 extends through another pair of registering apertures in the flattened end portion of the knuckle pin and the front wheel spindle to lock the spindle in a predetermined angular position relative to the knuckle pin. The flattened end portion of the spindle has one or more additional apertures, as indicated at 49, for the locking pin 48 so that the spindle can be secured to the knuckle pin at different selected angular positions.

A front wheel 50 is journaled on the spindle 44 and by selecting the aperture in the flattened end portion of the spindle receiving the locking pin 48 the front wheel can be disposed in an upwardly and outwardly inclined position, as illustrated in Figure 1, in a substantially vertical position, as illustrated in Figure 3, or in an upwardly and inwardly inclined position at the outer side of the corresponding sleeve, if such a position should be desired.

The front wheel unit or assembly 32 includes a front wheel 51, a front wheel spindle 52, a sleeve 53, a mounting block 54, a knuckle pin 55 and a steering arm 56 arranged in the same manner as the corresponding parts in the assembly 31, as described above.

A tie rod 57 extends along the front axle 25 and is pivotally connected near its opposite ends to the steering arms 41 and 56 to hold the front wheels substantially parallel to each other and to impart steering movements to the wheels by turning the knuckle pins 36 and 55 in the corresponding sleeves.

In the arrangement illustrated, a sector gear 58 is pivotally mounted on the tractor frame at 59 and an arm 60 projects from this gear and is provided near its outer end with a longitudinally extending slot receiving a pin 61 secured at one end to the tie rod 57 at the mid-length location of the latter. A pinion gear 62 is secured on the end of the steering shaft 16 adjacent the front end of the tractor and meshes with the sector gear 58 for turning the sector gear and swinging the arm 60 to thereby impart steering movements to the tie rod 57.

Figures 2, 8:
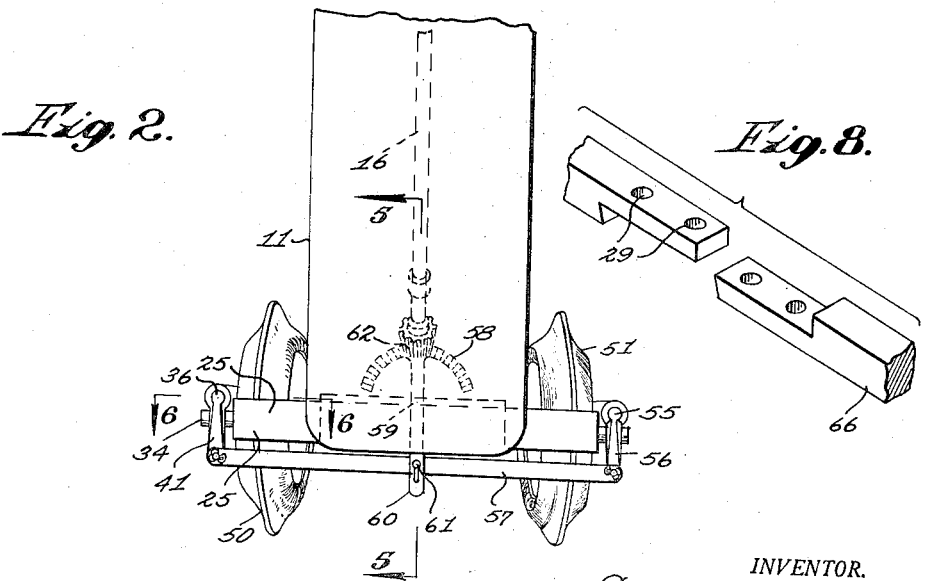
Figure 2 is a top plan view of the front end portion of the tractor illustrated in Figure 1.
Figure 8 is a perspective view of a fragmentary portion of the front end assembly showing structural details thereof.

Figures 1 and 2 show the front end assembly arranged so that the front wheels are placed close together and are upwardly and outwardly inclined to provide a so-called single front wheel arrangement for row crop cultivation. In this arrangement the front wheels are disposed at the inner sides of the corresponding sleeves and the steering arms project forwardly from the upper ends of the corresponding knuckle pins. In Figure 3 the front end assembly is arranged for an intermediate spacing of the wheels in which the wheels, while still disposed at the inner sides of the corresponding sleeves, are in substantially vertical position and Figure 4 shows the assembly arranged for wide spacing of the wheels with the wheels in substantially vertical position and disposed at the outer sides of the corresponding sleeves.

In the arrangement illustrated in Figure 4, the steering arms may still project forwardly from the upper ends of the corresponding knuckle pins by removing the steering arms from the knuckle pins and rotating the knuckle pins through 180° relative to the steering arms. The same tie rod may be used in the various arrangements by merely providing a tie rod of sufficient length and providing at each end of the tie rod a series of holes spaced apart longitudinally of the rod or by providing an adjustable length tie rod.

In the arrangement illustrated in Figures 3 and 4 front axle extensions 65 and 66 are interposed between the mounting blocks 33 and 54 respectively and the adjacent end of the front axle 25. Each of these extensions comprises a bar having a cross sectional size and shape substantially the same as that of the front axle and having longitudinally extending recesses provided one at each end thereof and in respectively opposite sides of the bar. The portion of the extension bar overlying the recess at one end thereof is shaped to fit the recess at the corresponding end of the front axle and is apertured to receive the bolts 30 while the recess at the other end of the extension bar is shaped to fit the mounting block, 33 or 54, and is apertured to receive bolts 67 which secure the mounting block to the extension bar. The use of the extension bars is optional depending on the desired spacing of the front wheels of the tractor and these extension bars may be provided in different lengths, if desired.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A front end assembly for a farm tractor comprising an elongated hollow bracket of rectangular cross sectional shape attachable to a tractor at the front end thereof to extend transversely of the tractor substantially perpendicular to the longitudinal center line of the tractor, an axle extending through said bracket and having cross sectional dimensions materially smaller than the cross sectional dimensions of said bracket, said bracket and said axle having transversely disposed apertures at their mid-length locations, a pivot pin extending through the transversely disposed apertures in said bracket and said axle mounting said axle in centered position in said bracket for rocking movements of the axle relative to the bracket, said axle having longitudinally extending recesses at its opposite ends, wheel assemblies secured one to each end of said axle, and steering means connected to said wheel assemblies, each of said wheel assemblies including a mounting block received in the recess at the corresponding end of said axle and rigidly secured thereto, a sleeve rigidly secured near one end to said mounting block at the outer end of the latter and depending from said mounting block substantially perpendicular to said axle, a knuckle pin extending through said sleeve, bearing means journaling said knuckle pin in said sleeve and restraining the knuckle pin against movement longitudinally of the sleeve, a front wheel spindle projecting from said knuckle pin at the end of said sleeve remote from said axle, and a front wheel journaled on said spindle, and said steering means comprising steering arms extending one from each of said knuckle pins at the ends of said pins adjacent said axle, and a tie rod extending along said axle and pivotally secured near its opposite ends to said steering arms at the distal ends of the latter.

2. A front end assembly for a farm tractor comprising an elongated hollow bracket of rectangular cross sectional shape attachable to a tractor at the front end thereof to extend transversely of the tractor substantially perpendicular to the longitudinal center line of the tractor, an axle extending through said bracket and having cross sectional dimensions materially smaller than the cross sectional dimensions of said bracket, said bracket and said axle having transversely disposed apertures at their mid-length locations, a pivot pin extending through the transversely disposed apertures in said bracket and said axle mounting said axle in centered position in said bracket for rocking movements of the axle relative to the bracket, said axle having longitudinally extending recesses at its opposite ends, wheel assemblies secured one to each end of said axle, and steering means connected to said wheel assemblies, each of said wheel assemblies including a mounting block received in the recess at the corresponding end of said axle and rigidly secured thereto, a sleeve rigidly secured near one end to said mounting block at the outer end of the latter and depending from said mounting block substantially perpendicular to said axle, a knuckle pin extending through said sleeve, bearing means journaling said knuckle pin in said sleeve and restraining the knuckle pin against movement longitudinally of the sleeve, a front wheel spindle projecting from said knuckle pin at the end of said sleeve remote from said axle, and a front wheel journaled on said spindle, and said steering means comprising steering arms extending one from each of said knuckle pins at the ends of said pins adjacent said axle, and a tie rod extending along said axle and pivotally secured near its opposite ends to said steering arms at the distal ends of the latter, each of said knuckle pins having a flattened lower end portion and each of said front wheel spindles having a flattened end portion disposed against one side of the flattened lower end portion of the corresponding knuckle pin, means pivotally connecting each wheel spindle to the corresponding knuckle pin for movement of the front wheel spindle relative to the knuckle pin to vary the angularity between the spindle and the pin, and means extending through the flattened end portions of said front wheel spindles and knuckle pins locking said spindles in selected positions of angular adjustment relative to the corresponding knuckle pins.

3. A front end assembly for a farm tractor comprising an elongated hollow bracket of rectangular cross sectional shape attachable to a tractor at the front end of the latter to extend transversely of the tractor substantially perpendicular to the longitudinal center line thereof, an axle extending through said bracket and having cross sectional dimensions smaller than the cross sectional dimensions of said bracket, said bracket and said axle having transversely disposed apertures at their mid-length locations, a pivot pin extending through the transversely disposed apertures in said bracket and said axle mounting said axle in centered position in said bracket for rocking movement of said axle relative to said bracket, said axle having longitudinally extending recesses at its opposite ends, axle extensions disposed one at each end of said axle and each having longitudinally extending recesses disposed one at each end and at respectively opposite sides thereof, said extensions being so disposed that one end portion of each extension is received in the corresponding recess in said front axle and the end portions of said front axle are received in the corresponding recesses in said extensions, means rigidly securing said extensions to said front axle, wheel assemblies secured one to each of said axle extensions at the outer ends of the latter, and steering means connected to said wheel assemblies, each of said wheel assemblies including a mounting block received in the recess at the outer end of the corresponding axle extension and rigidly secured to the corresponding extension, a sleeve rigidly secured near one end to said mounting block at the outer end of the latter and depending from said mounting block substantially perpendicular to said front axle, a knuckle pin extending through said sleeve, bearing means journaling said knuckle pin in said sleeve, means restraining the knuckle pin against movement longitudinally of the sleeve, a front wheel spindle projecting from said knuckle pin at the end of said sleeve remote from said corresponding axle extension, and a front wheel journaled on said spindle, and said steering means comprising steering arms extending one from each of said knuckle pins at the ends of the latter remote from said front wheel spindles, and a tie rod extending along said axle and said extensions and pivotally secured near its opposite ends to said steering arms at the distal ends of the latter.

GARNETT MAY.

REFERENCES CITED

The following references are of record in the file of this patent:

UNITED STATES PATENTS

| Number | Name | Date |
|---|---|---|
| 1,326,397 | Farnum | Dec. 30, 1919 |
| 2,074,685 | Engstrom | Mar. 23, 1937 |
| 2,178,505 | Warneke | Oct. 31, 1939 |
| 2,528,277 | Humes et al. | Oct. 31, 1950 |

FOREIGN PATENTS

| Number | Country | Date |
|---|---|---|
| 325,536 | Great Britain | Feb. 20, 1930 |